Patented Nov. 11, 1952

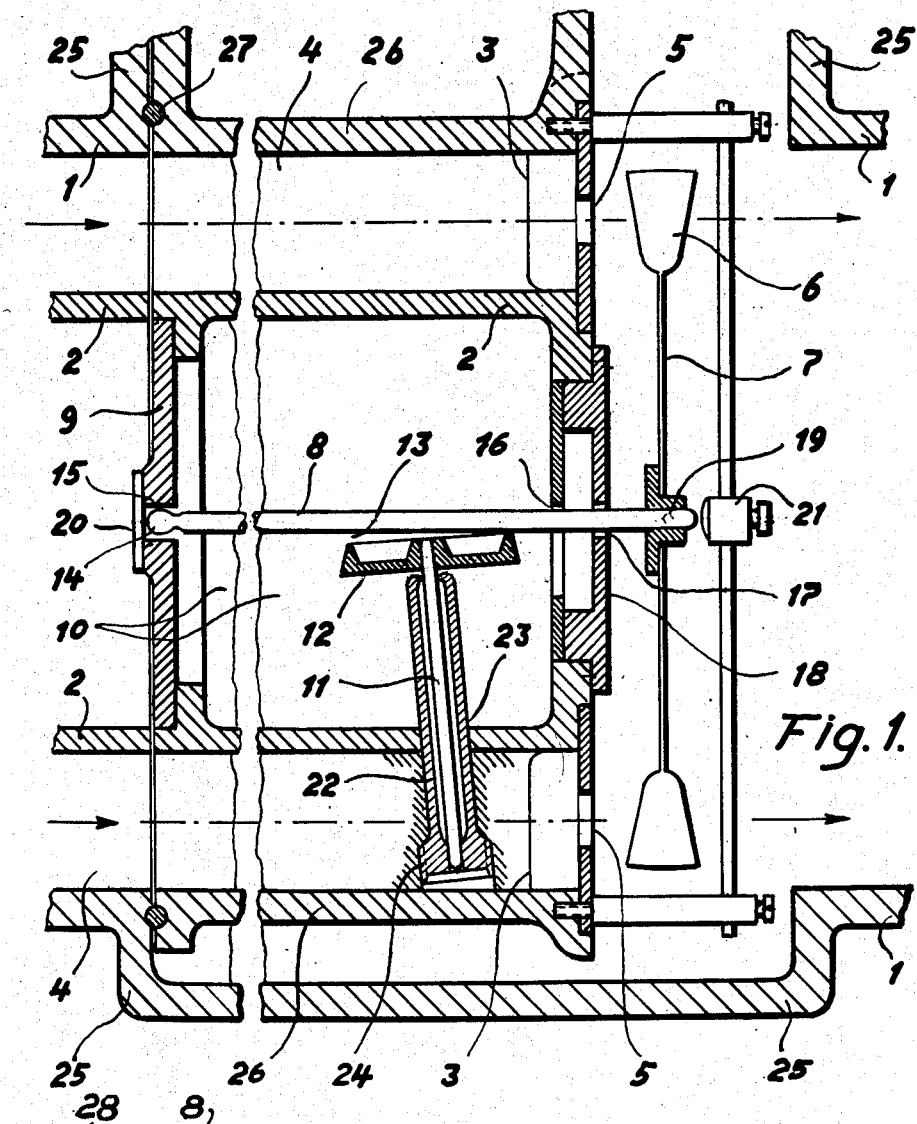

2,617,694

UNITED STATES PATENT OFFICE 2,617,694

BEARING ARRANGEMENT FOR HORIZONTAL ROTOR SHAFTS

Hans Gehre, Oberkassel-on-the-Rhine, Germany

Application March 3, 1951, Serial No. 213,717
In Germany March 7, 1950

7 Claims. (Cl. 308—8)

This invention relates to a bearing arrangement for horizontal rotor shaft. It particularly relates to a bearing arrangement used for horizontal rotor shafts on paddle wheel measuring instruments for the detection of small fluid currents.

The present invention is an improvement on an earlier invention which is described in Swiss Patent No. 229,216 and French Patent No. 883,750 of the applicant. In the said patents, two rotating discs are disclosed, each secured to a vertical shaft supported below by a point-face bearing, and each having an upwardly directed, annular knife-edge on its upper side. The rotor shaft rolls on these knife edges, one end on each, and is held exactly in the plane common to the two vertical shafts by guide devices. The rotating discs are thus loaded on one side.

When using the bearing arrangement as disclosed in the said patent, no lubrication, maintenance or inspection of any kind is required. By choosing the correct proportions of the relative parts of the device disclosed in the said patent, the friction loss may be reduced to an amount which is scarcely measurable. With such a construction, it becomes possible to build paddle wheel measuring instruments for the detection of very small air flows or gas streams which retain their accuracy even when they are operated continuously and are subjected to considerable overloading.

There are, however, several disadvantages in the use of the arrangement as disclosed in the said patent in very sensitive instruments. Since the very slight load of the rotor shaft is distributed between two rotating discs and thus is supported between two knife edges, the friction force between the knife edges and the rotor shaft is so small that the danger that the rotor shaft will slip on the knife edges instead of rolling arises. The inevitable consequence of such slippage is increased wear and shorter life of the parts.

In addition, the further disadvantage arises that when the load is distributed between two knife edges the assemblage of the rotating system, i. e., the horizontal rotor shaft and the parts rotating therewith as a unit, and its bearing arrangement cannot be constructed into a self-contained insert which can be removed as a whole from the housing. Such a construction is made impossible by unsurmountable difficulties. A relatively large construction of the length of the shaft, etc. is required in order to insure steady operation of the shaft when it is supported by the two knife edges. Such a large construction would necessarily entail a large opening in the housing, in order to enable removal as a unit. Such a large opening would weaken the housing to too great an extent in view of the heat stresses of the conduit which place large strains on the housing.

Consequently, in the known devices using the bearing structure as disclosed in the said patent, installation centering and adjustment of the rotor shaft, and trouble shooting for any source of disturbance must be carried on inside the assembled instrument. Because of this, these tasks are difficult and time-consuming, and the indispensable connecting elements e. g. bearing support, bridge, yoke, etc., add to the inaccessibility of the parts. Due to this, the desired control over the ease of operation of the rotor shaft is no longer possible.

Overcoming these difficulties is an urgent necessity for the sake of both economical manufacture and satisfactory workmanship. It is also indispensable that the instruments be capable of being correctly calibrated.

One object of this invention is to overcome all the aforementioned difficulties. This and further objects will become apparent from the following description read in conjunction with the drawing, in which:

Figure 1 shows a vertical section of a paddle wheel bearing in accordance with the invention, in a Woltman-meter, and Figure 2 shows another embodiment of the bearing according to the invention, with the disc shown in section and positioned in a vertical position, the rotor shaft having a constriction.

According to the present invention, the rotor shaft is mounted on a single disc with an upwardly pointing circular knife edge, which in turn is fixed to an upright shaft supported on its bottom by a point-faced bearing. The rotor shaft is in contact and supported by the knife edge of the disc at one point only, that point being substantially the point on the surface of the rotor shaft closest to the center of gravity of the whole rotating system, i. e., the rotor shaft and the parts rotating therewith as a unit. The ends of the rotor shaft are positioned to run freely in a guide.

Due to this arrangement, according to the invention, the total weight of the rotor shaft and its associated parts rests on a single point, so that the friction between the knife edge and the rotor shaft is a product of the entire weight of the rotor shaft and its associated parts and thus a slipless rolling of the rotor shaft on the annular knife edge is assured.

A further advantage of this arrangement lies in the fact that the necessary dimensions and thus the space for the rotating system are so reduced that the assemblage of its parts with the bearing arrangement into a self-contained unit which can be removed from the housing, no longer endangers the latter's stability or strength.

Thus, this unit can be assembled and the rotor shaft can be centered and adjusted outside the housing and all parts are easily accessible and open to inspection from all sides. Moreover, calibration is rendered extremely simple, since only the measuring inserts and not the entire apparatus need be calibrated.

Measuring inserts which can be removed from the meter housing are known and conventionally in use as, for example, in water meters. However, the use of this advantageous design had, prior to this invention, never been possible for Woltman meters and the like. The use of this design is first made possible in this type of meter by the present invention.

A further advantage of the present invention lies in the fact that a substantially steadier motion of the rotary shaft, as compared with prior known shafts, is assured. This is because only one yoke is required now, and due to the more accurate workmanship that is possible this can be given much less play than would be necessary where the rotor shaft rests on two knife edges, and where the parts are consequently less accessible.

Referring to the drawings, and in particular Figure 1, the paddle wheel bearing of a Woltman meter for detecting slight gas streams is shown. The meter comprises the cylindrical housing 1, and a flow-guide body 2, coaxially positioned therein. The flow-guide body is mounted in the housing by means of longitudinal rib 3 fastened to it. The housing 1 and the flow-guide body 2 enclose the annular channel 4, through which the gaseous medium to be measured is lead via a throttle section 5 to the blade rim 6 of the measuring wheel 6 and 7.

The shaft of the measuring wheel is designated 8. Its bearing arrangement is mounted in the usual way inside the flow-guide body 2 in a space 10 partitioned off by a wall 9. The bearing arrangement according to the invention comprises a single rotatable disc 12 on an upright axis 11 with an annularly upward directed knife edge 13 which supports the rotor shaft 8. The point of contact of the knife edge 13 and the surface of the rotor shaft 8 is at a point on the rotor shaft closest to the center of gravity of the whole rotatable system. A small journal 14 at one end of the rotor shaft 8 together with a hole 15 provided in the wall 9 constitute a stress-free guide, while the other end of the rotor shaft 8 is retained in position by a guide 16 formed as a yoke. The ends of the rotor shaft run freely and are limited by these guides.

The rotor shaft 8 passes from the space 10 through a hole 17 in the rear wall 18. The measuring wheel 6 and 7 is mounted at 19 on the end outside of this space. A plate 20 at one end of the rotor shaft 8 and an adjustable buffer 21 at the other end serve to keep the longitudinal movement of the rotor shaft 8 within the desired limits.

The bearing shell 22 of the upstanding shaft 11 is positioned through the wall of the space 10 at 23 and is screwed at 24 into a hole in the perpendicular, lowermost longitudinal rib 3 of the flow-guide body 2. The shaft 11 and the plane of the knife edge 13 lie at a slight inclination, and the point of contact, i. e. the bearing point of the horizontal rotor shaft lies at the highest point of the knife-edge.

Alternatively, however, as shown in Figure 2, the shaft 11 may be placed vertically so that the plane of the knife-edge is horizontal. In this construction, the rotor shaft 8 must be constricted at 28 to clear the knife edge at the opposite side of the disc from the point of support.

However, the construction illustrated in Figure 1 is preferred, as the constriction 28 will weaken the rotor shaft.

The housing 1 is provided with an annular widening 25 around the rotating system, in which a cylinder 26 is located so as to form a direct continuation of the outer wall of the annular channel 4. The cylinder 26 is removably mounted at the forepart of the housing and forms a seal with the housing by means of a packing 27. The arrangement is such that the rear part of the flow-guide body 2 which includes the space 10 with the shaft-bearing arrangement, constitutes a self-contained structural unit, which is easily removable from the forepart of the flow-guide body and which togeher with the surrounding cylinder 26, against which it is mounted with the ribs 3, forms a complete removable insertion in the housing 1.

In Figure 1 the removal is effected from above, where the housing widens at 25. The widening 25 is closed by a plate or flange or the like (not shown). It is obvious that the arrangement may be such that the insertion and removal is effected through a different opening as, for example, an opening provided laterally.

I claim:

1. A knife bearing arrangement for horizontal rotor shafts comprising a bearing disk having an upright circular knife edge, a shaft fixed to the center of said bearing disc at an angle of 90° from the plane of said knife edge, said shaft being positioned in a substantially upright position on a bearing, a rotor shaft supportedly positioned at one point of contact, by said knife edge, said point of contact being on the surface of said rotor shaft closest to the center of gravity of the rotor shaft and the parts rotating therewith as a unit, and guide means positioned for maintaining said rotor shaft in position on said knife edge without friction.

2. A bearing arrangement according to claim 1, in which said upright shaft is set at a slight inclination, the point of contact between knife edge and said rotor shaft being at the highest point on said circular knife edge.

3. A bearing arrangement according to claim 1, in which said upright shaft is in a vertical position, the plane of said knife edge being in a horizontal position, said rotary shaft having an annular constriction at a distance from said point of contact equal to the diameter of said circular knife edge, whereby a point 180° on said knife edge from the point of contact of said knife edge with said rotor shaft passes through said constriction without contact.

4. A bearing arrangement according to claim 1, in which said upstanding shaft is positioned in a bearing shell in a paddle wheel gas flow meter having a flow guide body defined by a wall, said bearing shell being positioned through the wall of said flow guide body from below in a vertical plane through the axis of the rotor shaft.

5. A bearing arrangement according to claim 4, in which the bearing shell of the upstanding shaft is positioned in a hole in a vertical lowermost longitudinal rib in the flow guide body.

6. A bearing arrangement according to claim 1, in which said upstanding shaft is positioned in a bearing shell in a paddle wheel gas flow meter having a flow guide body defined by a wall, said bearing shell being positioned in the wall of said flow guide body from below in a vertical plane through the axis of the rotor shaft, the rear part of said flow guide body enclosing the bearing arrangement being a self-contained structural unit positioned for removal from the forepart of the flow guide body.

7. A bearing arrangement according to claim 6, in which the rear part of the flow guide body enclosing the bearing is mounted in a cylinder by means of longitudinal ribs, said cylinder being located in an annular widening of the housing of the meter and positioned to form a direct continuation of the outer wall of an annular channel between the housing and the flow guide body, said cylinder, together with the rear portion of the flow guide, forming an insertion removable from the housing.

HANS GEHRE.

REFERENCES CITED

The following references are of record in the file of this patent:

FOREIGN PATENTS

| Number | Country | Date |
|---|---|---|
| 62,829 | Denmark | Oct. 23, 1944 |